United States Patent Office 3,654,167
Patented Apr. 4, 1972

3,654,167
WASHING POLYMERS
Harold S. Akrongold and Rochelle Akrongold, both of 39 Cathay Road, East Rockaway, N.Y. 11518
No Drawing. Continuation-in-part of application Ser. No. 601,330, Dec. 13, 1966. This application Dec. 23, 1969, Ser. No. 887,753
Int. Cl. C11d 3/30, 9/38, 17/00
U.S. Cl. 252—119
44 Claims

ABSTRACT OF THE DISCLOSURE

A hydrophilic gel of a polymeric fat acid polyamide and a diethanolamide of a fatty acid or a branched chain fatty acid for use as a detergent and in detergent type soaps.

This application is a continuation-in-part of our copending application U.S. Ser. No. 601,330, filed Dec. 13, 1966, now abandoned. This invention relates to polymerized fatty acid polyamides and diethanolamide of fatty acids which can be used as detergent and detergent soap type washing polymers.

More particularly, this invention relates to washing polymers in the form of gels derived from polyamide resins which may be either transparent, translucent or opaque and which have many properties that make them unique.

As used herein, the term "gel" is meant to include hydrophilic compositions which range from solids to liquids of the type encountered in the liquid household detergents. However, the viscosity of the composition of this invention is readily controlled during processing depending upon the use desired for the composition.

When practicing one preferred embodiment of this invention, a washing polymer is obtained by mixing, while heating, 5-95 parts by weight of a polymeric fat acid polyamide, preferably polymerized tall oil fat acid polyamide, and 1-95, preferably 10-80, and most preferably 25-60, parts by weight of a fatty acid compound such as diethanolamide of a fatty acid or a branched chain fatty acid neutralized with diethanolamine or mixture thereof, said fatty acid compound containing 6-22 carbon atoms, preferably 8-12 carbon atoms. The polymeric fat acid polyamide and the diethanolamide of a fat acid are heated to the melting point of the polyamide and then held for a period of time, up to 4 hours, preferably 15-30 minutes, at the melting point of the polyamide. The heated mixture is allowed to cool and form a gel which can be used as a washing polymer. Various embodiments and modifications to this basic product will be illustrated herein.

One of the primary ingredients, as indicated above, is a polyamide derived from polymerized fatty acids and diamines. The polymeric fat acids which may be employed in the method of preparing the polyamides are those resulting from the polymerization of drying or semi-drying oils or the free fat acids or simple alcohol esters of these fat acids. The term "fat acids" is intended to include saturated, ethylenically unsaturated and acetylenically unsaturated, naturally occurring, and any synthetic monobasic aliphatic acids containing from 16 to 24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are referred to herein as "dimeric fat radical" and "trimeric fat radical" respectively.

The saturated, ethylenically unsaturated, and acetylenically unsaturated fat acids are generally polymerized by somewhat different techniques, but because of the functional similarity of the polymerization product, they are generally referred to as "polymeric fat acids."

Saturated fat acids are difficult to polymerize but polymerization can be obtained at elevated temperatures with a peroxidic catalyst such as ditertiarylbutyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic, acid, behenic acid, and lignoceric acid.

The ethylenically unsaturated acids are much more readily polymerized. Suitable polymerization methods are disclosed in U.S. Pats. 3,256,304 and 3,157,681. The ethylenically unsaturated acids can be polymerized using both catalytic or non-catalytic polymerization techniques.

The preferred aliphatic acids are the mono- and polyolefinically unsaturated 18 carbon atom acids. Representative of such acids are 4-octadecenoic, 5-octadecenoic, 6 - octadecenoic (petroselinic), 7 - octadecenoic, 8 - octadecenoic, cis-9-octadecenoic (oleic), trans-9-octadecenoic (elaidic), 11-octadecenoic (vaccenic), 12-octadecenoic and the like. Representative octadecadienoic acids are 9,12 - octadecadienoic (linoleic), 9,11 - octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo-eleostearic) and the like. A representative 18 carbon atom acid having more than three double bonds is moroctic acid which is indicated to be 4,8,12,15-octadecatetraenoic acid. Representative of the less preferred (not as readily available commercially) acids are: 7-hexadecenoic, 9 - hexadecenoic (palmitoleic), 9 - eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenocic (cetoleic), and the like.

The polymerization of the described ethylenically unsaturated acids yields relatively complex products which usually contain a predominant portion of dimerized acids, a smaller quantiy of trimerized and higher polymeric acids and some residual monomers. The dimerized acids, generally containing 32 to 44 carbon atoms can be obtained in reasonably high purity from the polymerization products by vacuum distillation at low pressures, solvent extraction, or other known separation procedures. Although not necessary, the high purity dimer acids, having a dimer content of at least 80%, more preferably 90%, are highly usable within the scope of this invention. The polymerization product varies somewhat depending on the starting fat acid or mixture thereof and the polymerization technique employed—i.e. thermal, catalytic, particular catalyst, conditions of pressure, temperature, etc. Likewise, the nature of the dimerized acids separated from the polymerization product also depends somewhat on these factors although such acids are functionally similar.

As a practical matter, the dimeric fat acids are preferably prepared by the polymerization of mixtures of acids (or the simple aliphatic alcohol esters—i.e. methyl esters) derived from the naturally occurring drying and semi-drying oils or similar materials. Suitable drying or semi-drying oils include soybean, linseed, tung, perilla, oiticia, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined analytically by gas-liquid chromatography of the corresponding methyl esters. Unless otherwise indicated herein this analytical method was used in the analysis of the polymeric fat acids employed in this invention. Another method of determination is a micromolecular distillation analytical method. This method is that of R. F. Paschke et al., J. Am. Oil Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

The polyamides of this invention are preferably prepared by reacting the polymerized fat acids with a diamine. Generally the polyamides are prepared by the conventional amidification procedures, usually heating the reactants to a temperature between 100 and 300° C., preferably 200–215° C. for a time sufficient to complete the reaction, generally 2–8 hours. The resins of the above type are of the general type of polyamides as set forth in U.S. Pat. No. 2,450,940 and are commercially available under the tradenames Versamid (General Mills), Versalon (General Mills), and Emerez (Emery Industries) as well as other fatty acid polyamides. These resins have a molecular weight range of 2,000 to 10,000, as shown in U.S. Pat. No. 3,148,125, dated Sept. 8, 1964, and as disclosed in applicants' parent application Ser. No. 601,330, filed Dec. 13, 1966. The resins may also include other copolymerizing acid and amine components and the copolymerizing acids or diamines employed may be a single diamine or a mixture of two different copolymerizing reactants. In addition, small amounts of monomeric, monocarboxylic acids may be present. With regard to any of the acid components, any of the equivalent amide-forming derivatives thereof may be employed, such as the alkyl and aryl esters, preferably alkyl esters having from 1–8 carbon atoms, the anhydrides or the chlorides.

The diamines which may be employed may be ideally represented by the formula $$H_2N-R'-NH_2$$

where R' is an aliphatic, cycloaliphatic or aromatic hydrocarbon radical preferably having from 2 to 40 carbon atoms. Likewise, R' may contain both aliphatic and aromatic hydrocarbon groupings. Illustrative polyamines are ethylenediamine, hexamethylenediamine, tetramethylenediamine, and the like, bis(aminoethyl)benzene, cyclohexyl bis (methyl amine), dimeric fat diamine, etc. The diamine may be employed alone or in mixtures of two or more. The most preferred diamines are the alkylene diamines having 2–6 carbon atoms in the alkylene group and mixtures thereof with dimeric fat amines.

The dimeric fat diamine, sometimes referred to as "dimer diamine," "dimeric fat amine" or "polymeric fat acid diamine" are the diamines prepared by amination of dimeric fat acids. A suitable method of preparation is disclosed in U.S. Pat. 3,010,782.

Typically, the commercially available polymeric fat acid polyamide resins which are useful within the scope of this invention will have one or more of the following properties:

| | |
|---|---|
| Specific gravity | 0.96–1.02 |
| Amine value | 40–400 |
| Color, Gardner | 6–12 |
| Softening point (Ball & Ring ° C.) | 90–200 |
| Polymer tensile strength, p.s.i. | 800–7500 |
| Polymer elongation | 200–900 |

As is indicated above, the polymeric fat acid is heated with a diethanolamide of a fatty acid. Condensation products of diethanolamine with fatty acids have long been known in the art and are prepared by the commonly referred to "Kritchevsky" reaction. Preferably, the condensation products disclosed in U.S. Pat. 2,089,212 are useful within this invention. These reaction products are exemplified by a reaction of two moles of diethanolamine with one mole of $C_6$–$C_{22}$, preferably $C_8$–$C_{12}$, fatty acids. Typical processes to produce the above products are disclosed in Kritchevsky Re. 21,530 and U.S. Pat. 2,094,608. Typical fatty acids useful in the Kritchevsky reaction include lauric, myristic, and any of those which are found in the so-called "coco" fatty acids and the like.

The washing polymer prepared in accordance with this invention can be readily used in the form of washing bars, soft gels, and the like. The bars are hydrophilic and exhibit highly desirable washing characteristics. They are also completely soluble and behave in the same manner as an ordinary bar of soap, whereby they diminish in size and finally are completely used up. They, therefore, cannot be readily distinguished in their dissolubility and other properties from an ordinary bar of soap.

It has also been found that into the foregoing system there can be added useful and desirable washing compounds without affecting the clarity. That is, a transparent bar prepared from components of the foregoing type will retain its transparency even upon the incorporation therein of such washing compounds as, e.g., anionic surfactants such as triethanolamine lauryl sulfate, diethanolamine lauryl sulfate, various alkylaryl sulfonates, sodium and triethanolamine stearate, sarcosinates, and protein based surfactants; nonionic surfactants such as, e.g., the ethoxylated octyl and nonyl phenols; cationic surfactants such as any of the "Tegamines," for instance, "Tegamine O" (dimethyl amino propyl oleamide); amphoteric surfactants such as, e.g., "Miranol $C_2M$." The amount of surfactant that may be so added to the polyamide-diethanolamide system may vary widely, e.g., from about 5 to 75% by weight of the final product.

Additionally, it has been found that soap (sodium stearate) can be added to the polyamide-diethanol amide system giving a resulting product which in its esthetic and washing properties resembles the glycerine type soaps. These washing bars are transparent, translucent, or opaque and the general slip and washing feel are that of soap. The amount of soap which can be incorporated into the above system may vary from as little as desired, e.g., 0.1%, up to about 95% by weight of the finished product. Of course, as the amount of soap incorporated increases, the optical properties of the finished product gradually change from transparent to translucent to opaque.

It is of course frequently desirable to incorporate oils into the washing systems to serve as super fatting or emollient agents. It has been discovered that this can readily be done. For instance, when a cationic surfactant such as "Tegamine O" is incorporated in the system, the system is then rendered compatible with super fatting agents such as, e.g., mineral oil, isopropyl myristate, lanolin, and the like, and the resultant product retains its initial transparency, translucence, or opaqueness.

An alternative means of rendering the washing system compatible to oils is by the expedient of adding thereto a branched chain fatty acid, e.g., isostearic acid, Neodecanoil Acid, Versatic Acid 1519, etc. Of course, the amount of branched chain fatty acid so added will vary, depending upon the amount of oil that is to be incorporated. Typically such acid will be from about 1 to 25 weight percent of the finished composition, and the amount of oil may be from about 1 to 50% by weight of the finished composition.

It has also been found that if the polyamide is pre-treated with n-propyl alcohol and thereafter the diethanolamide is added, the resulting gel exhibits a greater degree of softness as well as improved washing characteristics. By contrast, a firmer bar is obtained when the alcohol is added after admixing the polyamide and diethanolamide. The amount of n-propyl alcohol employed may be from about 0.1 to 50% by weight of the finished composition.

It has been found that the physical and chemical properties of these washing bars or washing oil bars can be altered by addition and treatment with various additives. For instance, the hardness of the bar can be adjusted by appropriate addition to the polyamide-diethanolamide system of a dimer acid such as, e.g., Empol 1014, in an amount of typically from about 0.1 to 20% by weight of the finished bar.

It has additionally been discovered that if the polyamide, e.g., a Versamid, is pre-treated (prior to addition of diethanolamide) with other polymeric materials such as, e.g., polyvinyl pyrrolidone, methyl cellulose, acrylamide-acrylic acid copolymer, or the like, gels having novel and unique properties are obtained. For instance, if the polyamide is pre-treated with an alkaline material such as triethanolamine the resulting polymer is more receptive to subsequent chemical treatment with a diethanolamide, thereby giving a product of altered chemical nature, e.g., greater hardness. On the other hand, if polyvinyl pyrrolidone is employed in the pre-treatment, the resulting gel exhibits marked adhesiveness. By contrast, if methyl cellulose is used in the pre-treatment, one obtains a product which is highly soluble for machine washings, tends to disinfect, and imparts an excellent softness of hand to woolens and cottons. Alternatively, if an acrylamide-acrylonitrile is employed for the pre-treatment, there results a bar having unusual resistance to crumbling.

It has also been found that a firmer and longer lasting bar can be obtained by the simple expedient of pretreating the polyamide resin with either sulfuric acid or hydrogen peroxide and thereafter treating the resulting product with diethanolamide. Thus, upon pre-treating a polyamide, say Versamid 930, with 0.1 normal sulfuric acid solution for about 3 to 4 hours, and subsequently adding to the resulting product a diethanolamide of a fatty acid, there results an unusually firm and long lasting bar. Similar results are obtained if the polyamide is pre-treated with a 1% hydrogen peroxide solution.

According to another embodiment of this invention, and relating to the foregoing two-component system (polyamide-fatty acid diethanolamide), these compositions may be readily modified so as to exhibit antiseptic properties, as by the introduction of a halogen, preferably idoine or bromine. The amount of halogen so introduced may be from about 1 to 10% by weight of the finished composition. The halogen present is in the form of a complex. Hence, its antiseptic properties are present, yet its toxicity is reduced to an acceptable level.

It is also possible to form the unique detergent bar of this invention by mixing one of the surfactants as disclosed herein with a polyamide and n-propyl alcohol, thereby using the n-propyl alcohol to form the gel. Other additives can be used in place of the surfactant to give a very soapy product, e.g., diethanolamide of lauric acid.

A further advantage of this system resides in the fact that it may permit one to obtain a product containing a large proportion of a solvent, such as n-propyl alcohol. such a product will, of course, exhibit highly desirable cleaning properties by virtue of the inherent solvent characteristics.

It has also been discovered that a detergent-soap system may be prepared by treating a polyamide of the foregoing type with a branched chain fatty acid, e.g., isostearic acid, and thereafter neutralizing the resulting formed product with diethanol amine. The resulting product may be considered to be a soap and is transparent. Moreover, such product possesses an unusual and most attractive property in that its soap characteristics can be readily increased by the addition of straight chain stearic acid into the reaction mixture. Surprisingly, the resultant soap retains its transparency.

It will of course be apparent that with respect to all of the foregoing systems which have been described, suitable additives may be incorporated, e.g., perfumes, dyes, antiperspirants such as aluminum chlorohydrol, etc.

The following examples will further illustrate this invention. Unless otherwise stated, all parts are by weight.

EXAMPLE 1

Fifty parts of Versamid 930 (polymerized fatty acid polyamide) and 50 parts of Schercomid CDO Extra (diethanolamide of mixed fatty acids) are heated at 85° C. for 30 minutes. The resulting product is a hard transparent bar having medium foaming qualities.

EXAMPLE 2

An example of a transparent marketable washing bar is as follows:

| | Parts |
|---|---|
| (A) Schercomid CDO Extra | 20 |
| (B) Versamid XR 1635 (polymerized fatty acid polyamide) | 28 |
| (C) n-Proply alcohol | 5 |
| (D) Maprofix TLS 65 (triethanolamine lauryl sulfate) | 35 |
| (E) Maprofix 2109 (diethanolamine lauryl sulfate) | 12 |
| (F) Sequestrene AA (ethylene diamine tetraacetic acid) | 0.07 |

The Schercomid is heated to 85° C., and then the Versamid is added over an 8 to 10 minute interval to form a homogeneous liquid, the temperature being maintained at 85° C. Thereafter, the Maprofix TLS65 and 2109 and the Sequestrene are added, the whole is permitted to cool to 65° C., and the n-propyl alcohol is added. The resulting product is cooled to 60° C. and then cast into a mold.

The cooled product is a hard transparent washing bar which is high foaming. Moreover, if desired, this composition can serve as the matrix.

If instead of casting the foregoing composition to form a solid bar, it is instead cast into a mold containing a sponge, e.g., a polyurethane sponge, then this composition serves as a matrix for the sponge and the two cooperate to form a sponge bar. Of particular interest is the fact that the resulting sponge bar is essentially transparent, that is, the above composition which is inherently transparent tends to impart its own transparency to the polyurethane sponge. In use, the composition is dissolved away at a predetermined rate to expose the sponge. Eventually, nothing is left but the sponge.

Of course, rather than employing a polyurethane sponge, other materials may be employed, e.g., steel wool, "Tuffy" type scour pads, non-woven fabrics, and the like.

EXAMPLE 3

Thirty-five parts of Versamid 930, 30 parts of Foamole L (diethanolamide of lauric acid), and 25 parts of Superamid GR (diethanolamide of mixed fatty acids) are heated at 85° C. for 30 minutes. The temperature of the mixture is then raised to 95° C., and 10 parts of soap (sodium stearate) are added. The resulting transparent washing bar is unique in that it exhibits the properties characteristic of glycerine transparent soaps along with the properties associated with transparent bars.

EXAMPLE 4

Twenty parts of Versalon 1165 (polymerized fatty acid polyamide) and 80 parts of Foamole L are heated at 85° C. for 30 minutes. The resultant gel is transparent and is thixotropic. Thus, it can be extruded from a tube. This composition is eminently suited as an extrudable composition suitable for gel shampoos and the like.

EXAMPLE 5

Thirty parts Versamid 930, 40 parts Foamole L, 15 parts isopropyl myristate, and 10 parts isostearic acid are heated for 1 hour at a temperature of 30° C. The resulting transparent solid bar is superfatted and will replace some of the oils which have been removed by the washing action of this bar.

EXAMPLE 6

Forty parts Versamid 930 and 40 parts of Foamole L are mixed and heated to 85° C. for 30 minutes. Then 3.5 parts of Empol 1014 (dimer acid) are added. The mixture is then cooled to 70° C. and 16.5 parts of n-propyl alcohol are added. The resultant product is a solid transparent bar of extreme hardnes, yet has excellent washing properties.

EXAMPLE 7

Thirty parts of Versamid 940 (polymerized fatty acid polyamide) and 5 parts of triethanolamine are heated at 75° C. for 25 minutes. Thirty-five parts of Schercomid CDO (a mixed fatty acid amide), which previously had been heated to 85° C., is added and the whole is heated for an additional 15 minutes. Thereafter the mixture is cooled to 65° C. and 30 parts of n-propyl alcohol is added. The resulting product is a hard transparent bar which is an excellent cleaning product into which may also be incorporated, if desired, cationic surfactants such as, e.g., Tegamine O.

EXAMPLE 8

Fifty parts of Versamid XR 1635 (polymerized fatty acid polyamide) and 48.4 parts of Superamid GR are heated at 70° C. for one-half hour. Thereafter the temperature is raised to 85° C., and 1.6 parts of citric acid added, and the whole is maintained at 85° C. for 1 hour. The resultant product is a hard transparent bar having a scroopy feel characteristic of acid detergent formulations.

EXAMPLE 9

Twenty parts of Emerez 1535 (polymerized fatty acid polyamide) and 70 parts Schercomid CDO are heated at 85° C. for one-half hour. Thereafter 10 parts of oleic acid is added and the entire mixture maintained at 85° C. for 1 hour. The resulting transparent washing bar has a definite emollient or "greasy" feel.

EXAMPLE 10

Sixty parts of Versamid 710 (polymerized fatty acid polyamide) and 18 parts of Foamole L are heated at 85° C. for 30 minutes. The temperature is then lowered to 70° C. and 20 parts of n-propyl alcohol is added, and the entire mixture is permitted to stand for 10 minutes at 70° C. Thereafter 2 parts of citric acid is added, and the complete mixture stands for an additional hour at 70° C. The resultant hard transparent bar is excellent for metal cleaning.

EXAMPLE 11

Fifteen parts of Versamid 940 and 15 parts of Schercomid CDO are heated at 85° C. for 30 minutes. The temperature is then lowered to 70° C. and 15 parts of n-propyl alcohol is added, and the mixture is permitted to stand for an additional hour at 70° C. Thereafter 20 parts of oleic acid is added and the mixture is permitted to stand for an additional hour. The resulting hard translucent product is an excellent general-purpose washing bar with an emollient feel.

EXAMPLE 12

Fifty parts of Sun-Kem Nylon 543 (polymerized fatty acid polyamide) and 3.5 parts of triethanolamine are heated at 85° C. for 30 minutes. Then 46.5 parts of Superamid GR (previously heated to 95° C.) is added and the entire mixture is brought to 95° C. and maintained at this temperature for 60 minutes. The resultant transparent bar is characterized by unusual hardness and dirt-removing ability.

It should be noted that with respect to the foregoing example, if instead the triethanolamine is added after the Sun-Kem Nylon 543 and Superamid GR have been heated, then a somewhat softer bar results.

EXAMPLE 13

Ninety parts of Emerez 150 (polymerized fatty acid polyamide resin) is treated with 10 parts PVP K30 (polyvinyl pyrrolidone) by heating to 75° C. for 30 minutes, at which point there is added 90 parts Foamole L. The resultant solid transparent product exhibits marked adhesive properties and may be used in a wide variety of applications, e.g., in the preparation of a corn plaster.

EXAMPLE 14

Ninety-five parts Emerez 1535 (polymerized fatty acid polyamide) is treated with 5 parts of Methocel 60 HG 4000 (methyl cellulose) by heating to 90° C. for 30 minutes. The resultant product is then further treated with 30 parts n-propyl alcohol to produce a gel. Thirty parts Siposan 7 LUF (cationic surfactant) is added which results in a solid transparent product which will dissolve very well in a washing machine giving excellent softness of hand to woolen and cotton fabrics.

EXAMPLE 15

Four parts of Ciba resin 325 (acrylamide-acrylic acid polymer) and 20 parts Lauter Polyamid 1866 (polymerized fatty acid polyamide) are heated at 80° C. for 1 hour. There are then added 30 parts isostearic acid and 50 parts triethanolamine and the whole is permitted to stand for 15 minutes at 80° C. The resulting solid transparent product is an excellent washing bar having desirable non-crumbling characteristics.

If in the foregoing example only 3 parts of isostearic acid and 5 parts of triethanolamine are employed, there results a polymer which can then be dissolved in a suitable solvent, e.g., ethyl alcohol, for use as a hairspray.

EXAMPLE 16

Ninety parts of Versamid 930 are pre-treated with 10 parts of a 10% solution of 0.1 N sulfuric acid for 3 to 4 hours at 65° C. and then the resulting product is admixed with 60 parts Schercomid CDO (diethanol amide of mixed fatty acids). The resultant solid transparent product is much harder and longer lasting than a similar bar made without the sulfuric acid pre-treatment.

Similar results are obtained if instead of employing sulfuric acid for the pre-treatment there is instead substituted a 1% hydrogen peroxide solution.

EXAMPLE 17

Forty parts Versamid 940, 25 parts n-propyl alcohol, and 20 parts Siposan 7 LUF are heated at 80° C. for 25 minutes. The resultant gel is highly suitable for use as a cream rinse bar or as a clothes softener.

EXAMPLE 18

Forty parts Versamid 930 and 30 parts isostearic acid are heated for 15 minutes at 85° C. At this point 35 parts triethanolamine are added to neutralize and form a soap detergent solid transparent polymeric bar.

It should be noted that, if desired, any of the foregoing compositions may be modified so as to exhibit antiseptic characteristics, e.g., by the incorporation of a halogen such as iodine, bromine, or the like. This is illustrated by the following example.

EXAMPLE 19

The procedure described in Example 2 is repeated, however, at 70° C. There is added 0.5 part iodine crystals. The resulting transparent bar is transparent and has a yellowish tint. It has excellent antiseptic properties yet is perfectly safe because of the "taming effect" of the detergent polymer.

EXAMPLE 20

This illustrates the convering of a transparent bar to an opaque bar. Twenty parts Schercomid CDO Extra are heated to 85° C. Twenty-eight parts Versamid XR 1635 are added over an 8 to 10 minute interval until a homogeneous liquid is formed, to which 35 parts Maprofix TLS 65, 12 parts Maprofix 2109, and 0.07 part Sequestrene AA are added, and the mixture is then cooled to 65° C. Five parts n-propyl alcohol are then added and the mixture is cooled to 60° C. and poured into an appropriately shaped mold. To this composition, which is still transparent, 8 parts of Polectron 450 (vinyl pyrrolidone-styrene copolymer) are added. The resultant bar is white and resembles normal commercial sodium stearate bars. Of course, similar opaque bars may readily be obtained by employing, instead of the vinyl pyrrolidone-styrene copolymer, another suitable component that is incompatible with this system.

EXAMPLE 21

A diethanolamide of a fatty acid was prepared in accordance with the teaching of U.S. Pat. 2,089,212 by reacting 2 moles of diethanolamine with 1 mole of "coco" fatty acid. A high molecular weight polymerized fatty acid polyamide (Milvex 1000) in an amount of 24 parts by weight and 20 parts by weight of the diethanolamide prepared above along with 4 parts of isostearic acid placed in a beaker and heated to 85° C. for 30 minutes. Upon cooling, a clear solid soap bar was obtained.

It will of course be apparent that with respect to the compositions produced in accordance with any of the foregoing examples, other surfactants, whether cationic, anionic, nonionic, or amphoteric, may be added to increase the washing ability.

Variations can, of course, be made without departing from the spirit and scope of this invention.

The embodiments of the invention in which an exclusive property or privilege is claimed are defined as follows:

1. A detergent composition consisting essentially of a hydrophilic gel reaction product formed by mixing:
   (I) 5–95 parts by weight of a polyamide resin product having a molecular weight of about 2,000 to about 10,000 and formed by the reaction of:
      (a) a polymerized 16 to 24 carbon atom fatty acid; and
      (b) a diamine selected from the group consisting of alkylene diamines having 2–6 carbon atoms in the alkylene group, bis (aminoethyl) benzene, cyclohexyl bis (methyl amine), dimeric fat diamine, and mixtures thereof; and
   (II) 1–95 parts by weight of a diethanolamide of a fatty acid having 6–22 carbon atoms.

2. A composition as in claim 1 wherein the diethanolamide of a fatty acid is the reaction product of 2 moles of diethanolamine and one mole of fatty acid.

3. A composition as in claim 1 wherein the diethanolamide is present in an amount of 10–80 parts by weight.

4. A composition as in claim 1 wherein the diethanolamide is present in an amount of 25–60 parts by weight.

5. A composition as in claim 1 wherein the diamine is an alkylene diamine having 2–6 carbon atoms in the alkylene group.

6. A composition as in claim 1 wherein the diethanolamide has 8–12 carbon atoms.

7. A composition as in claim 1 including up to 50% by weight of the composition of n-propyl alcohol.

8. A composition as in claim 7 wherein the polyamide is mixed with n-propyl alcohol prior to mixing the polyamide with the diethanolamide.

9. The composition of claim 1 and including from about 5 to 75% by weight of a surfactant selected from the group consisting of anionic, cationic, nonionic and amphoteric surfactants.

10. The composition of claim 1 and including soap in an amount up to 95% by weight of the composition.

11. The composition of claim 1 and including about 1 to 10% by weight of a halogen selected from the group consisting of iodine and bromine.

12. The composition of claim 1 and including up to 20% by weight of a dimer acid consisting essentially of a $C_{36}$ aliphatic dibasic acid.

13. The composition of claim 1 and including about 1 to 50% by weight of an emollient.

14. The composition of claim 1 and including an effective amount of a perfume.

15. The composition of claim 1 and including an effective amount of a dye.

16. The composition of claim 1 and including an effective amount of an antiperspirant.

17. The composition of claim 1, said composition being transparent.

18. The composition of claim 1 wherein said composition is a body having an abrasive body embedded therein.

19. The composition of claim 18 wherein said abrasive body is a member of the group consisting of sponge, plastic wool and steel wool.

20. The composition of claim 1 wherein the polyamide is pretreated by being mixed with a member selected from the group consisting of triethanolamine, sulfuric acid and hydrogen peroxide and heated for a period of time sufficient to result in a product of increased hardness.

21. The composition of claim 1 wherein the polyamide resin is pretreated by being mixed with polyvinyl pyrrolidone and heated for a period of time sufficient to result in a product with adhesive properties.

22. The composition of claim 1 wherein the polyamide resin is pretreated by being mixed with an acrylamide-acrylic acid copolymer and heated for a period of time sufficient to result in a product with non-crumbling characteristics.

23. The composition of claim 1 wherein the polyamide resin is pretreated by being mixed with methyl cellulose and heated for a period of time sufficient to result in a product with fabric softening properties.

24. A detergent composition consisting essentially of a hydrophilic gel reaction product formed by mixing:
   (I) 5–95 parts by weight of a polyamide resin product, having a molecular weight of about 2,000 to about 10,000 and formed by the reaction of:
      (a) a polymerized 16 to 24 carbon atom fatty acid, and
      (b) a diamine selected from the group consisting of alkylene diamines having 2–6 carbon atoms in the alkylene group, bis (aminoethyl) benzene, cyclohexyl bis (methylamine), dimeric fat diamines, and mixtures thereof; and
   (II) 1–95 parts by weight of a branched chain fatty acid having 6–22 carbon atoms;
      and, thereafter, neutralizing the total mixture with either diethanolamine or triethanolamine.

25. A composition as in claim 24 wherein the diethanolamide of a fatty acid is the reaction product of 2 moles of diethanolamine and one mole of fatty acid.

26. A composition as in claim 24 wherein the branched chain fatty acid is present in an amount of 10–80 parts by weight.

27. A composition as in claim 24 wherein the branched chain fatty acid is present in an amount of 25–60 parts by weight.

28. A composition as in claim 24 wherein the diamine is an alkylene diamine having 2–6 carbon atoms in the alkylene group.

29. A composition as in claim 24 wherein the branched chain fatty acid has 8–12 carbon atoms.

30. A composition as in claim 24 including up to 50% by weight of the composition of n-propyl alcohol.

31. A composition as in claim 30 wherein the polyamide is mixed with n-propyl alcohol prior to mixing the polyamide with the branched chain fatty acids.

32. The composition of claim 24 and including about 1 to 10% by weight of halogen selected from the group consisting of iodine and bromine.

33. The composition of claim 24 and including up to 20% by weight of a dimer acid consisting essentially of a $C_{36}$ aliphatic dibasic acid.

34. The composition of claim 24 and including about 1 to 50% by weight of an emollient.

35. The composition of claim 24 and including an effective amount of a perfume.

36. The composition of claim 24 and including an effective amount of a dye.

37. The composition of claim 24 and including an effective amount of an antiperspirant.

38. The composition of claim 24, said composition being transparent.

39. The composition of claim 24 wherein said composition is a body having an abrasive body embedded therein.

40. The composition of claim 39 wherein said abrasive body is a member of the group consisting of sponge, plastic wool and steel wool.

41. The composition of claim 24 wherein the polyamide is pretreated by being mixed with a member selected from the group consisting of triethanolamine, sulfuric acid and hydrogen peroxide and heated for a period of time sufficient to result in a product of increased hardness.

42. The composition of claim 24 wherein the polyamide resin is pretreated by being mixed with polyvinyl pyrrolidone and heated for a period of time sufficient to result in a product with adhesive properties.

43. The composition of claim 24 wherein the polyamide resin is pretreated by being mixed with an acrylamide acrylic acid copolymer and heated for a period of time sufficient to result in a product with non-crumbling characteristics.

44. The composition of claim 24 wherein the polyamide resin is pretreated by being mixed with methyl cellulose and heated for a period of time sufficient to result in a product with fabric softening properties.

References Cited

UNITED STATES PATENTS

| | | | |
|---|---|---|---|
| 3,148,125 | 9/1964 | Strianse et al. | 424—64 |
| 3,383,320 | 5/1968 | Bell | 252—132 |
| 3,256,304 | 6/1966 | Fischer et al. | 260—407 |
| 3,157,681 | 11/1964 | Fischer | 260—407 |
| 2,450,940 | 10/1948 | Cowan et al. | 260—404.5 |

LEON D. ROSDOL, Primary Examiner

D. L. ALBRECHT, Assistant Examiner

U.S. Cl. X.R.

252—8.8, 107, 117, 118, 132, 134, 542, 544, 548, 174, DIG 2, 16; 260—404.5